United States Patent
Sander

(10) Patent No.: US 8,766,607 B2
(45) Date of Patent: Jul. 1, 2014

(54) POWER CONVERSION DEVICE USING A WAVE PROPAGATION MEDIUM AND OPERATING METHOD THEREOF

(75) Inventor: Sverker Sander, Billdal (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 19 days.

(21) Appl. No.: 13/702,268

(22) PCT Filed: Jun. 11, 2010

(86) PCT No.: PCT/EP2010/058258
§ 371 (c)(1),
(2), (4) Date: Dec. 5, 2012

(87) PCT Pub. No.: WO2011/154054
PCT Pub. Date: Dec. 15, 2011

(65) Prior Publication Data
US 2013/0094256 A1    Apr. 18, 2013

(51) Int. Cl.
*G05F 3/16* (2006.01)
*G05F 1/00* (2006.01)
*H02M 3/158* (2006.01)

(52) U.S. Cl.
USPC .......................................... 323/225; 323/271

(58) Field of Classification Search
CPC ......... H02M 3/00; H02M 3/07; H02M 3/155; H02M 3/156; H02M 3/158
USPC ................. 323/222–225, 268, 271, 282, 351; 363/60, 63
See application file for complete search history.

(56) References Cited

U.S. PATENT DOCUMENTS 6,486,697 B1 *  11/2002  Svensson et al. ............... 326/30
6,696,853 B2 *  2/2004   Svensson et al. ............... 326/30

(Continued)

FOREIGN PATENT DOCUMENTS

WO    2008051119 A1    5/2008

OTHER PUBLICATIONS

Phinney, Joshua et al., "Multi-resonant Microfabricated Inductors and Transformers", 2004 35th Annual IEEE Power Electronics Specialists Conference; Jun. 20-25, 2004; Aachen, Germany; pp. 4527-4536; vol. 6; Laboratory for Electromagnetic and Electronic Systems, Massachusetts Institute of Technology, Room 10-171, Cambridge, MA 02139.

(Continued)

*Primary Examiner* — Timothy J Dole
*Assistant Examiner* — Ivan Laboy Andino
(74) *Attorney, Agent, or Firm* — Coats & Bennett, P.L.L.C.

(57) ABSTRACT

The present solution relates operation of a power conversion device (200, 500). A first gate (205, 505) is operated (901) to provide a voltage pulse (309,609) travelling from an input (201,501) to a wave propagation medium (105) through the first gate (205,505). The voltage pulse has duration (307,607) less than the propagation time through the medium (105) to one end of the medium (105) and back to the input (201,501). The pulse generates a reflected wave. The first gate (205,505) is operated (902) periodically providing a voltage pulse in synchronization with the reflected wave to accumulate the reflected wave travelling in the medium (105), performing the accumulation through an accumulation interval (303,603). A second gate (207,507) is operated (903) periodically to provide a discharge pulse (312,612) in synchronization with the reflected wave to discharge the wave travelling in the medium (105), performing the discharge through a discharge interval (310,610).

15 Claims, 11 Drawing Sheets

(56) References Cited

U.S. PATENT DOCUMENTS

| | | |
|---|---|---|
| 6,917,217 B2 * | 7/2005 | Herz .............................. 326/21 |
| 6,946,868 B2 * | 9/2005 | Svensson et al. ............... 326/30 |
| 8,174,247 B2 * | 5/2012 | Sander .......................... 323/225 |
| 2004/0183566 A1 | 9/2004 | Svensson |
| 2010/0033157 A1 * | 2/2010 | Sander .......................... 323/351 |
| 2011/0254594 A1 * | 10/2011 | Sander .......................... 327/108 |

OTHER PUBLICATIONS

Djukic, Slavko et al., "A Planar 4.5-GHz DC-DC Power Converter", IEEE Transactions on Microwave Theory and Techniques; Aug. 1999; pp. 1457-1460, vol. 47, No. 8; IEEE Service Center, Piscataway, NJ.

* cited by examiner

POWER CONVERSION DEVICE USING A WAVE PROPAGATION MEDIUM AND OPERATING METHOD THEREOF

TECHNICAL FIELD

This invention relates generally to a power conversion device and a method for operating the power conversion device. More particularly this invention relates to operating a power conversion device utilizing a wave propagation medium.

BACKGROUND

Several different solutions exist in order to provide a suitable voltage to an electrical circuit, both as supply voltage and as voltage input to the circuit. Often a Direct Current/Direct Current (DC/DC) converter is used to convert a voltage from a fixed level to another level, for example step up or step down. Similarly Alternating Current/Direct Current (AC/DC) converters are used to convert an AC voltage to DC voltage at a certain level.

It is known to use an electrical transmission line for DC/DC voltage conversion in a switching manner using short pulses traveling in the transmission line and synchronizing switches to perform the DC/DC voltage conversion. This is known for example through WO2008/051119.

"Multi-resonant passive components for power conversion," by J. Phinney, Ph.D. Thesis, Dept. of Electrical Engineering and Comp. Science, Massachusetts Institute of Technology, Laboratory for Electromagnetic and Electronic Systems, 2005 describes a push-pull converter, in which two switches are used to generate an AC square-wave output on the transformer secondary. By replacing the center-tapped transformer with a multi-resonant transformer having the appropriate dynamics it allows one switch and a primary winding to be eliminated. The multi-resonant transformer may be either single resonance links or an entire transmission line. However, the switch elimination example is only applicable to a transformer isolated circuit and can not be used for switch elimination in fundamental non-isolated buck, boost or buck-boost power conversion circuits.

By using a microwave transmission line, or other electrical propagating medium, electrical power may be converted. This may be used to render DC/DC-, AC/DC-, DC/AC-converters or amplifiers and radio transmitter systems.

The use of conventional DC/DC voltage converters may sometimes be problematic due to response times and cost considerations. In high frequency applications such components need to be highly optimized to function properly. There is also an increasing demand on suppliers of high frequency equipment for cost reductions at all levels, e.g. in the telecommunications industry cost reductions and efficiency optimization is a strong market driver. Furthermore, this is also true for amplifiers in high frequency applications.

Depending on circuitry configuration and applications, the above mentioned solutions may sometimes not be optimal and alternative solutions may be better suited. Furthermore, there exist many applications within high frequency applications where solutions for different types of power conversion types may find applicability.

Different types of electrical/communication configurations may require a plurality of different types of solutions within the same circuitry and in different modules interoperating with each other. The different types of solutions are not always compatible with each other and require different types of knowledge basis.

Radio frequency applications pose a complex situation in order to provide a working solution for transferring electrical signals/power to/from functions in such applications.

Another disadvantage of the prior art is that it the power conversion solutions requires a high number of semiconductors, which makes the electrical circuit large, complex and expensive.

FIG. 1a illustrates OVer Sampling (OVS) according to the prior art, which is defined as the duration of active operation state $t_{on}$ 101 of the switch 103 being less than the reflected wave's period time $2t_d$ in a transmission line 105. An active state is a state where the switch 103 is turned on, i.e. it goes from an inactive state to an active state. FIG. 1b illustrates SUb Sampling (SUS) according to the prior art, which is defined as the duration of active operation state $t_{on}$ 101 of the switch 103 being equal or greater than the reflected wave's period time $2t_d$ in the transmission line 105. Typically 100-1000 times longer. $t_d(s)$ is the propagation time in transmission line 105. T(s) is the period time of current steps at transmission line 105 input, $T=2t_d$.

When using over sampling mode, two separate DC output voltages may share the same inductive and free wheel diode components by time multiplexing, thus reducing the required number of semiconductors. Over sampling mode also enables polarity change possibilities by setting one of the transmission line's ends to be shorted or open. The power conversion efficiency will be poor when using over sampling solely.

When operating in over sampling mode the voltage drop, e.g. from input DC to output DC voltage, is created in the, relative to the transmission line, mismatched output capacitor. However this type of mismatched voltage conversion ($\Gamma \neq 1$, $\Gamma \neq 0$, $\Gamma \neq -1$) will not yield higher power conversion efficiency than a conventional series regulator, i.e. a Low Drop Out regulator (LDO).

SUMMARY

The objective problem is therefore to provide an alternative mechanism for power conversion.

According to a first aspect of the invention, the objective problem is solved by a method for operating a power conversion device. The power conversion device comprises at least one electrical input interface, at least a first electrical gate and a second electrical gate, at least one electrical wave propagation medium and at least one electrical output interface connectable to a load. Together, the electrical input interface, the first gate, the second gate, the electrical wave propagation medium and the electrical output interface forms an electric circuit. The first gate is operated to switch to an active state so as to provide at least one voltage pulse travelling from the electrical input interface to the electrical wave propagation medium through the first gate. The at least one voltage pulse has a time duration less than two times the wave propagation time through the electrical wave propagation medium, i.e. $2t_d$. The at least one voltage pulse is reflected at one end of the electrical wave propagation medium. The first gate is operated to periodically switch to an active state providing at least one accumulation voltage pulse in synchronization with the at least one reflected electrical wave, so as to accumulate the reflected electrical wave travelling in the electrical wave propagation medium, performing the accumulation through an accumulation sub sampling interval. The second gate is operated to periodically switch to an active state such as to provide at least one discharge voltage pulse in synchronization with the at least one reflected electrical wave, so as to discharge the electrical wave travelling in the electrical wave propagation medium, performing the discharge through a discharge sub sampling interval.

According to a second aspect of the invention, the objective problem is solved by a power conversion device comprising at least one electrical input interface, at least a first electrical gate and a second electrical gate, at least one electrical wave propagation medium, at least one electrical output interface connectable to a load. The power conversion device further comprises an operating circuit configured to operate the first gate to switch to an active state so as to provide at least one voltage pulse travelling from the electrical input interface to the electrical wave propagation medium through the first gate. The at least one voltage pulse has a time duration less than two times the wave propagation time through the electrical wave propagation medium, i.e. $2t_d$. The at least one voltage pulse is reflected at one end of the electrical wave propagation medium. The operating circuit is further configured to operate the first gate to periodically switch to an active state providing at least one accumulation voltage pulse in synchronization with the at least one reflected wave, so as to accumulate the reflected electrical wave travelling in the electrical wave propagation medium, performing the accumulation through an accumulation sub sampling interval. Even further, the operating circuit is configured to operate the second gate to periodically switch to an active state such as to provide at least one discharge voltage pulse in synchronization with the at least one reflected wave, so as to discharge the electrical wave travelling in the electrical wave propagation medium, performing the discharge through a discharge sub sampling interval. Together, the electrical input interface, the first gate, the second gate, the electrical wave propagation medium, the electrical output interface and the operating circuit forms an electric circuit.

Thanks to the operation of a first and second gate in a power conversion device utilizing a wave propagation medium, an alternative mechanism for power conversion is provided. This is obtained by operating the first gate to switch to an active state so as to provide at least one voltage pulse travelling from the electrical input interface to the electrical wave propagation medium through the first gate. The at least one voltage pulse has a time duration less than two times the wave propagation time through the electrical wave propagation medium, i.e. $2t_d$. The at least one voltage pulse is reflected at one end of the electrical wave propagation medium. The first gate is operated to periodically switch to an active state providing at least one accumulation voltage pulse in synchronization with the at least one reflected wave, so as to accumulate the reflected electrical wave travelling in the electrical wave propagation medium, performing the accumulation through an accumulation sub sampling interval. The second gate is operated to periodically switch to an active state such as to provide at least one discharge voltage pulse in synchronization with the at least one reflected wave, so as to discharge the electrical wave travelling in the electrical wave propagation medium, performing the discharge through a discharge sub sampling interval.

The present technology affords many advantages, for which a non-exhaustive list of examples follows:

An advantage of the present solution is that time multiplexing in mixed OVS/SUS mode renders reduced semiconductor component count with maintained high efficiency power conversion. This reduces the physical size, complexity and cost of the power conversion devices, and optimizes the efficiency of the device.

Another advantage of the present solution is that it is possible to achieve controllable output voltage polarity, by alternating the transmission line end to be short or open, with maintained high power conversion efficiency. This reduces the physical size and cost of the power conversion devices, and optimizes the efficiency of the device. The reduced number of semiconductor components, in for example an AC/DC application, also reduces the complexity of the power conversion device.

The present solution is not limited to the features and advantages mentioned above. A person skilled in the art will recognize additional features and advantages upon reading the following detailed description.

BRIEF DESCRIPTION OF THE DRAWINGS

The present solution will now be further described in more detail in the following detailed description by reference to the appended drawings illustrating embodiments of the solution and in which.

Figure 1A:
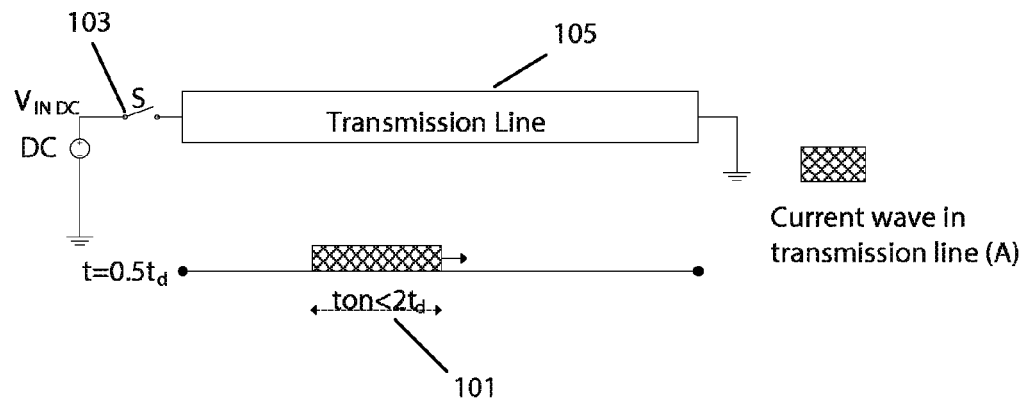
FIGS. 1a and b is a block diagram illustrating the prior art principle of over sampling and sub sampling.
Figure 1B:
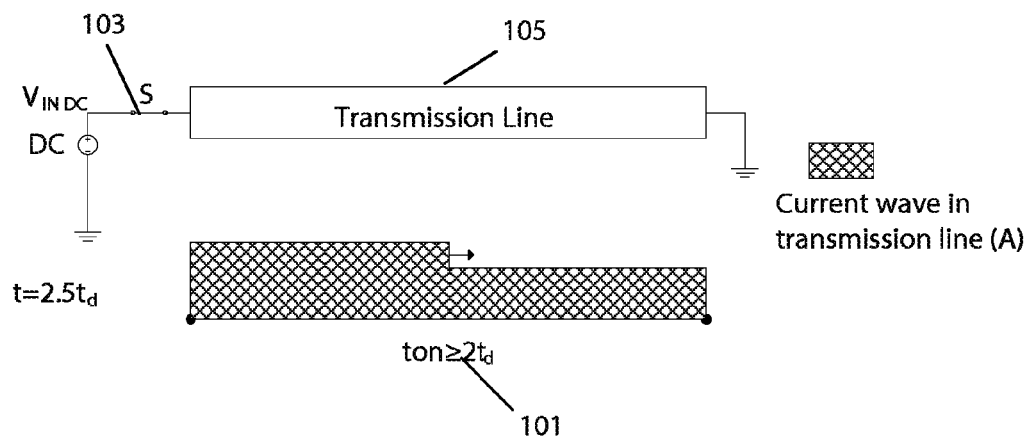

The drawings are not necessarily to scale, emphasis is instead being placed upon illustrating the principle of the present solution.

DETAILED DESCRIPTION

The basic concept of the present solution is that by mixing sub- and over sampling operation modes a time multiplexing of component resources, and a voltage polarity alternation is possible with maintained high power conversion efficiency.

In more detail, the present solution relates to different electrical power conversions of electrical energy in an electrical circuit using a wave propagation medium, such as a transmission (delay) line or similar electrical transmission delay paths, such as a lumped transmission line, a strip line, a micro strip, a Printed Circuit Board (PCB) track, a coaxial cable, an artificial transmission line, and so on, and properties of impedance mismatch in relation to the transmission line/ path. When an electrical wave is transmitted in a transmission line/path and encounters an impedance mismatch, at least part of the electrical wave is reflected back into the transmission line/path.

The sub sampling effect, together with over sampling techniques, and together with suitable electrical components may be utilized for performing different types of electrical power conversions finding applicability as for instance in a:

Buck converter
Pulsed power amplifier alternation
Waveform generator or a bit controlled DC/DC converter/amplifier
Continuous power amplifier
Boost converter
Radio transmitter with switch mode generated carrier
Step down- or up DC/DC converter with multiple output voltages sharing at least one semiconductor
AC/DC converter with reduced number of semiconductors
DC/AC converter with reduced number of semiconductors The electrical power conversion may be implemented as different embodiments according to the present solution, such as for example as a buck converter, a boost converter or a buck-boost converter. The buck converter is also referred to as a step down converter, and the boost converter is also referred to as a step up converter. The different converters may operate in different modes, such as a sub sampling mode, an over sampling mode or a mixed sub and over sampling mode.

The step down converter presented below may have multiple, independently controlled output voltages. The output voltages will be sharing the same free wheel diode and transmission line 105. This circuit will consequently reduce the number of required semiconductors compared to two conventional buck converters. The number of semiconductors in a conventional buck converter versus the number of semiconductors required in a mixed SUS/OVS step down converter is illustrated in table 1 below. This semiconductor reduction may also be used in a mixed SUS/OVS step up converter as an alternative to two or more conventional boost converters.

TABLE 1

| No. of $V_{OUTDC}$ | No. of semiconductors, conventional buck converters | No. of semiconductors, mix SUS/OVS step down converter |
|---|---|---|
| 1 | 2 | 2 |
| 2 | 4 | 3 |
| 3 | 6 | 4 |

The following text applies only for the mixed sub/over sampling mode. Each output voltage is assigned to a time slot $t_d(s)$. During this time slot, an inductor, i.e. a transmission line, may be used to store or free wheel energy for each output voltage independently with maintained high power conversion efficiency. This may be seen as a time multiplexing of free wheel diode and inductor resources. It should be noted that the available total output power is constant with increasing number of output voltages.

Figure 2:
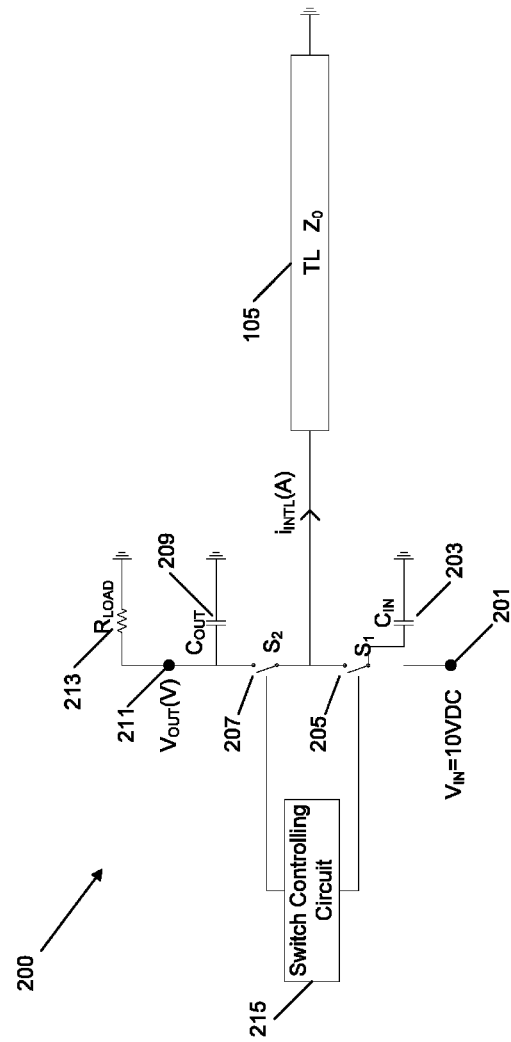
FIG. 2 is a block diagram illustrating an embodiment of a power converter device according to the present solution that may be used in mixed sub and over sampling mode.

FIG. 2 illustrates a power converter device 200 exemplified as a buck-boost converter operated in what is referred to as a mixed sub and over sampling mode according to the present solution. The power converter device 200 comprises a voltage input interface $V_{IN}$ 201, an input capacitance $C_{IN}$ 203, a first electrical gate, e.g. a switch, $S_1$ 205, $S_1$ is connected to a second electrical gate, e.g. switch, $S_2$ 207 and with their common node connected to a transmission line TL 105. The transmission line TL 105 has an input end and an output end. The output end, i.e. the far end of the transmission line TL 105 is connected to ground. The transmission line TL 105 has the characteristic impedance $Z_0$. The voltage input interface $V_{IN}$ 201 may be supplied by a DC voltage source of for example 10V DC. The transmission line TL 105 is connected to an output capacitance $C_{OUT}$ 209, a voltage output interface $V_{OUT}$(V) 211 and a load $R_{LOAD}$ 213. The input capacitance $C_{IN}$ 203 is used as a low impedance source for the transmission line TL 105, and the output capacitance $C_{OUT}$ 209 holds the output voltage when no energy is supplied from the transmission line. The load $R_{LOAD}$ 213 is a consumer of the output voltage through the output voltage interface $V_{OUT}$(V) 211. A switch controlling circuit 215, such as for example a micro processor, is connected to the switches $S_1$ 205 and $S_2$ 207, and is configured to control and operate the two switches $S_1$ 205 and $S_2$ 207. The buck-boost converter steps up or steps down the input voltage from the voltage input source at the voltage input interface $V_{IN}$ 201 to an output voltage $V_{OUT}$(V) 211.

Figure 3:
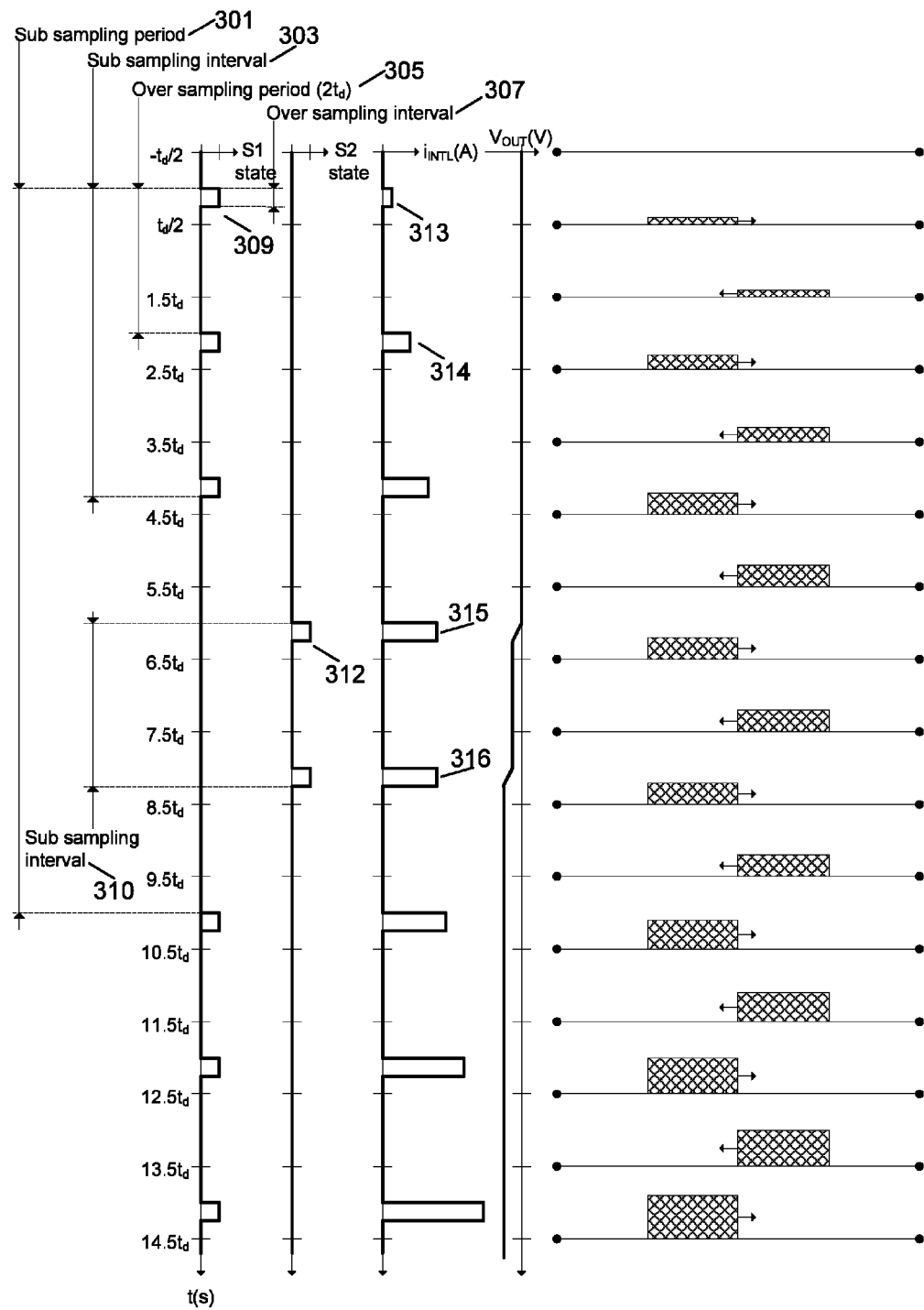
FIG. 3 is a timing and amplitude diagram illustrating operation of a power converter device in mixed sub and over sampling mode according to a first embodiment of the present solution.

The operation of this power converter device 200 exemplified as a buck boost-converter operated in a mixed sub and over sampling mode is illustrated in FIG. 3 according to a first embodiment of the present solution. The FIG. 3 illustrates the states of the switches $S_1$ 205 and $S_2$ 207 and the current into the transmission line TL 105 ($i_{INTL}$) at a start up phase of the operation of the device 200. The output voltage $V_{OUT}$ of the power converter device 200 is also shown in FIG. 3. A more detailed description of the output voltage $V_{OUT}$ is found below in relation to FIG. 8. At steady state, when the output power plus losses is equal to the input power, the output voltage $V_{OUT}$ 211 will fluctuate around a fixed DC level, e.g. −20 VDC. The loss may be losses in the $C_{IN}$, $S_1$, $S_2$, TL, $C_{OUT}$ and additional PCB losses. The cross hatched box represents the amplitude of the current wave and the arrow represents the direction of travel of the current wave, while the line on which the current wave is shown, in y-axis representing the zero current level and in x-axis representing the position in meters along the transmission line TL 105.

The sub sampling period 301 is exemplified in FIG. 3 as $10t_d$, and describes the period in which the accumulation sub sampling interval 303 is repeated. The accumulation sub sampling interval 303 for the first switch $S_1$ 205 describes the interval in which an electrical wave is accumulated in the transmission line TL 105. The discharge sub sampling interval 310 for the second switch $S_2$ 207 describes the interval in which the accumulated electrical wave is discharged through the second switch $S_2$ 207. The over sampling period 305 is illustrated as $2t_d$. The over sampling interval 307 is here exemplified with a $t_d/4$ time length The first switch $S_1$ 205 and the second switch $S_2$ 207 are operated periodically by the switch controlling unit 215. The switches 205, 207 are in a conducting position, i.e. in an active state, substantially separated from each other in time.

An operation cycle at start up is shown in FIG. 3 and is described in the text below:

t<0

No energy resides in the transmission line TL 105 or in the output capacitor $C_{OUT}$ 209. The output voltage 211 is zero. The input capacitor $C_{IN}$ 203 voltage is equal to the applied DC voltage to the input voltage interface 201.

t=0

The switch $S_1$ 205 is turned on briefly, forming an over sampling interval 307, for example with a length of $t_d/4$. A positive current wave 318, cross hatched, and a positive voltage wave propagates into the transmission line 105. During this over sampling interval the current into the TL 105 $i_{INTL}$ 313 is given by the input DC at the voltage interface 201 divided by the characteristic impedance of the transmission line TL 105.

$t=t_d/2$

The current wave has reached half way through the transmission line TL 105.

$t=t_d$

The current wave reaches the short circuited far end of the transmission line TL 105. The current wave will consequently be totally reflected with unchanged sign, while the voltage wave will change polarity.

$t=1.5t_d$

The reflected current wave has reached half way in its way back to the input end of the transmission line TL 105.

$t=2t_d$

The reflected current wave reaches the input end of the transmission line TL 105. The switch $S_1$ 205 is turned on for a second time and with the same over sampling interval duration. The current wave will now be almost fully reflected in the low impedance of the input capacitor $C_{IN}$ 203. $C_{IN}$ 203 is large and has very low impedance at the frequency $f=\frac{1}{2}t_d$ of which the reflected waves appear. The current wave will have unchanged sign, while the voltage wave will change polarity.

At the same time the second turn on of switch $S_1$ 205 is generating a second current wave, with energy supplied from the DC voltage source to the input voltage interface 201. The second generated current wave will be superimposed on the first generated current wave. This can be seen in the increase of the input current 314 of the transmission line TL 105 and in the graphical presentation of the accumulated composite/resulting current wave at $t=2.5t_d$ (cross hatched).

$t=2.5t_d$

The composite current wave has reached half way through the transmission line TL 105.

$t=3t_d$

The composite current wave reaches the short circuited far end of the transmission line TL 105. The composite current wave will be totally reflected with unchanged sign, while the voltage wave will change polarity.

$t=3.5t_d$

The reflected composite current wave has reached half way in its way back to the input end of the transmission line TL 105.

$t=4t_d$

The reflected composite current wave reaches the input end of the transmission line TL 105. The switch $S_1$ 205 is turned on a third time. The previous described superposition, see $t=2t_d$, is carried out a second time.

$t=4.25t_d$

The energy accumulating the sub sampling interval 303 is ended.

$t=4.5t_d$

The composite current wave has reached half way through the transmission line TL 105.

$t=5t_d$

The composite current wave reaches the short circuited far end of the transmission line TL 105. The composite current wave will be totally reflected with unchanged sign, while the voltage wave will change polarity.

$t=5.5t_d$

The reflected composite current wave has reached half way in its way back to the input end of the transmission line TL 105.

$t=6t_d$

The switch $S_2$ 207 is briefly 312 turned on during an over sampling interval 307 with the same length as used previously. This turn on forms the start of the discharge sub sampling interval 310.

The energy accumulated in the transmission line TL 105 is now partially discharged into the parallel coupled output capacitor $C_{OUT}$ 209 and the load $R_{LOAD}$ 213. The current floating into these two components is shown in 315. The output voltage $V_{OUT}$ 211 will start to rise from zero volts.

$t=6.5t_d$

The composite current wave, reflected in the parallel coupled output capacitor $C_{OUT}$ 209 and load $R_{LOAD}$ 213, has reached half way through the transmission line TL 105. The load $R_{LOAD}$ 213 will be supplied with energy from the output capacitor $C_{OUT}$ 209. The output voltage $V_{OUT}$ 211 will consequently decrease slowly.

$t=7t_d$

The composite current wave reaches the short circuited far end of the transmission line TL 105. The composite current wave will be totally reflected with unchanged sign, while the voltage wave will change polarity. The load $R_{LOAD}$ 213 will be supplied with energy from the output capacitor $C_{OUT}$ 209. The output voltage $V_{OUT}$ 211 will consequently decrease slowly.

$t=7.5t_d$

The reflected composite current wave has reached half way in its way back to the input end of the transmission line TL 105. The load $R_{LOAD}$ 213 will be supplied with energy from the output capacitor $C_{OUT}$ 209. The output voltage $V_{OUT}$ 211 will consequently decrease slowly.

$t=8t_d$

The second switch $S_2$ 207 is briefly turned on a second time during an over sampling interval 307 with the same length as used previously. The energy accumulated in the transmission line TL 105 is now partially discharged a second time into the parallel coupled output capacitor $C_{OUT}$ 209 and the load $R_{LOAD}$ 213. The current floating into these two components is shown in 316. The output voltage $V_{OUT}$ 211 will start to rise a second time.

$t=8.25t_d$

The energy discharge sub sampling interval 310 is ended. The load $R_{LOAD}$ 213 will be supplied with energy from the output capacitor $C_{OUT}$ 209. The output voltage $V_{OUT}$ 211 will consequently decrease slowly until next discharge sub sampling interval is started.

$t=10t_d$

The first sub sampling period 301 is ended and a new begins.

Figure 4:
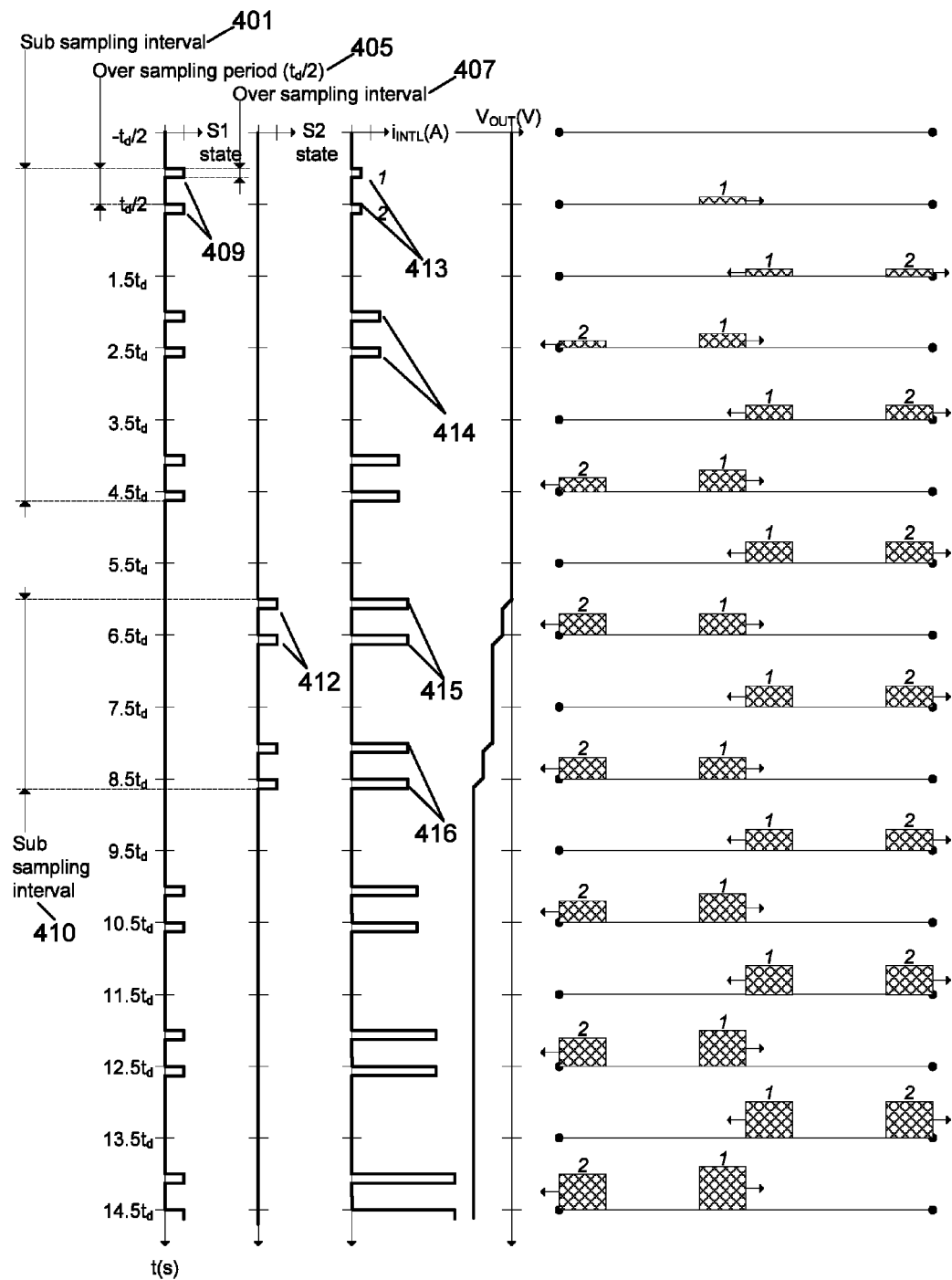
FIG. 4 is a timing and amplitude diagram illustrating operation of a power converter device in mixed sub and over sampling mode according to a second embodiment of the present solution.

FIG. 4 illustrates the operation of the power converter device 200 according to a second embodiment of the present solution exemplified as a buck-boost converter in mixed sub and over sampling operation mode, but where the over sampling period 405 is selected as an integer division, in this example $t_d/2$, of the previous over sampling period $2t_d$ 305 shown in FIG. 3. $t_d$ may be for example in the ns range if a PCB track is used, or for example in the μs range if a lumped TL is used. The operation of the power converter device 200 exemplified in FIG. 4 is equal to the one illustrated in FIG. 3, except that the procedure is repeated twice during each $2t_d$ time frame. Thus, FIG. 4 is not further discussed. The output voltage $V_{OUT}$ of the power converter device 200 is also shown in FIG. 4. A more detailed description of the output voltage $V_{OUT}$ is found below in relation to FIG. 8.

Figure 5:
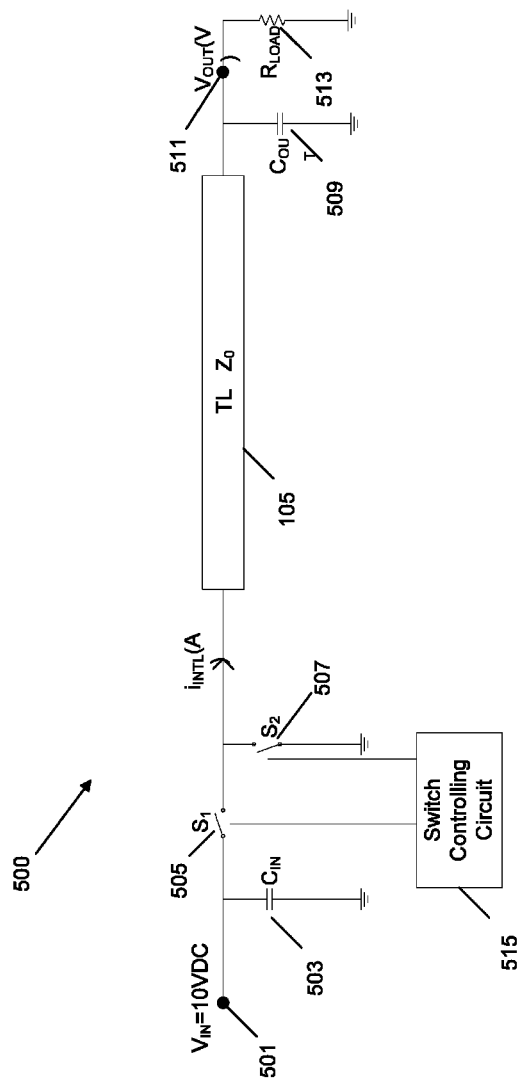
FIG. 5 is a block diagram illustrating an embodiment of a power converter device according to the present solution that may be used in mixed sub and over sampling mode.

FIG. 5 illustrates a power converter device 500 exemplified as a buck converter, i.e. a step down converter, operated in mixed sub and over sampling mode according to another embodiment of the present solution. The power converter device 500 comprises a voltage input $V_{IN}$ 501, an input capacitance $C_{IN}$ 503, a first electrical gate, e.g. a switch, $S_1$ 505 connected to a second electrical gate, e.g. switch, $S_2$ 507. The voltage input $V_{IN}$ 501 may be for example 10V DC. The transmission line TL 105 is connected to an output capacitance $C_{OUT}$ 509, a voltage output $V_{OUT}(V)$ 511 and a load $R_{LOAD}$ 513. A switch controlling circuit 515, such as for example a micro processor, is connected to the switches $S_1$ 505 and $S_2$ 507, and is configured to control and operate the two switches, i.e. turning the switches on and off.

The exemplified buck converter operated in mixed sub- and over sampling mode follows the same typical waveforms as previously described for the buck-boost converter, with the exception that the output voltage raises in a slightly different manner. Therefore only the main difference between the buck-boost converter and the buck converter operation is described in the following parts.

Figure 6:
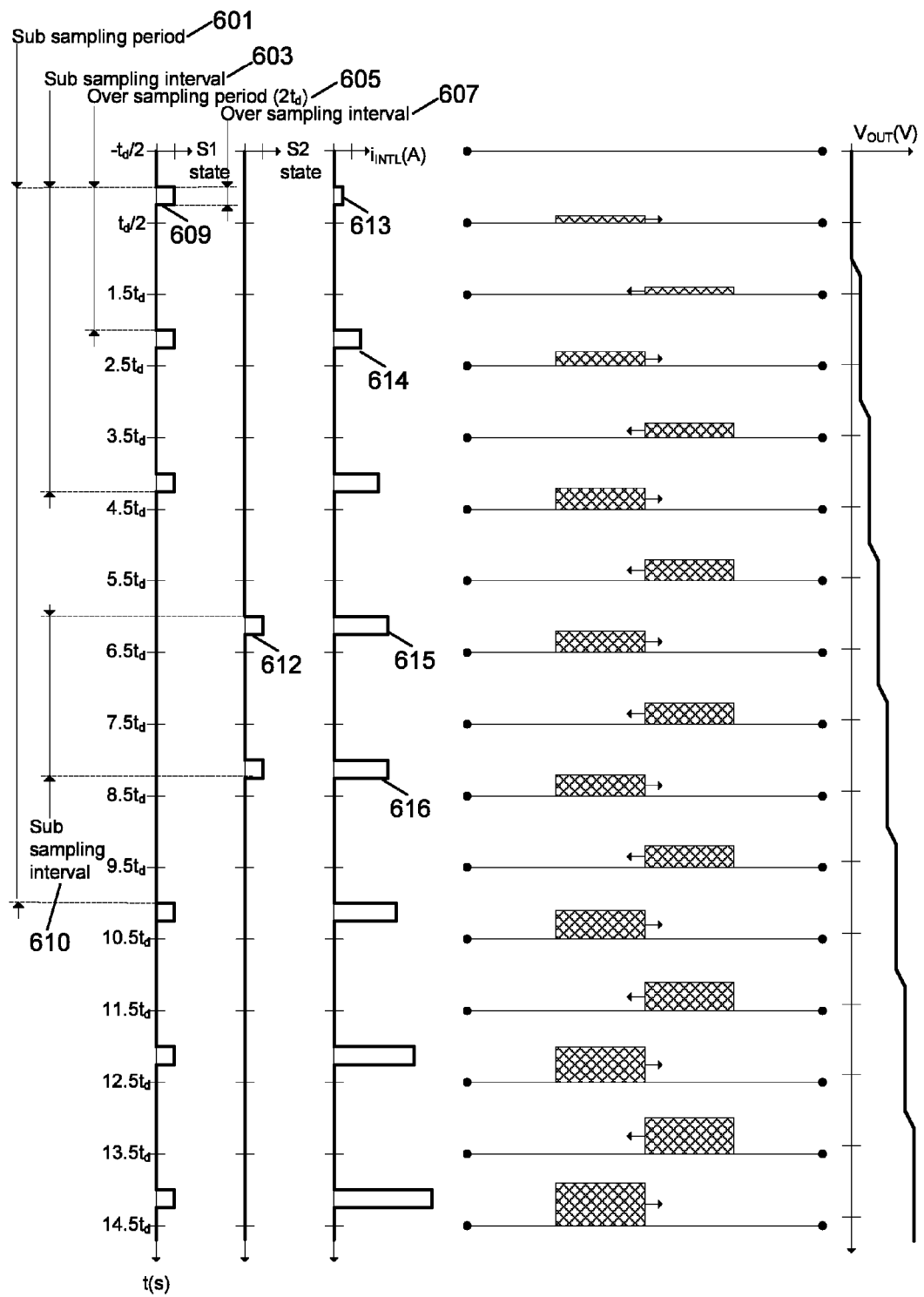
FIG. 6 is a timing and amplitude diagram illustrating operation of a power converter device in mixed sub and over sampling mode according to a third embodiment of the present solution.

FIG. 6 illustrates the operation of the power converter device 500 exemplified as a buck converter in mixed sub and over sampling operation mode, where the over sampling period 605 is $2t_d$ according to a third embodiment. The output voltage $V_{OUT}$ of the power converter device 200 is also shown in FIG. 6. A more detailed description of the output voltage $V_{OUT}$ is found below in relation to FIG. 8. See previous description of time instances for the buck-boost circuit in FIG. 3.

Figure 7:
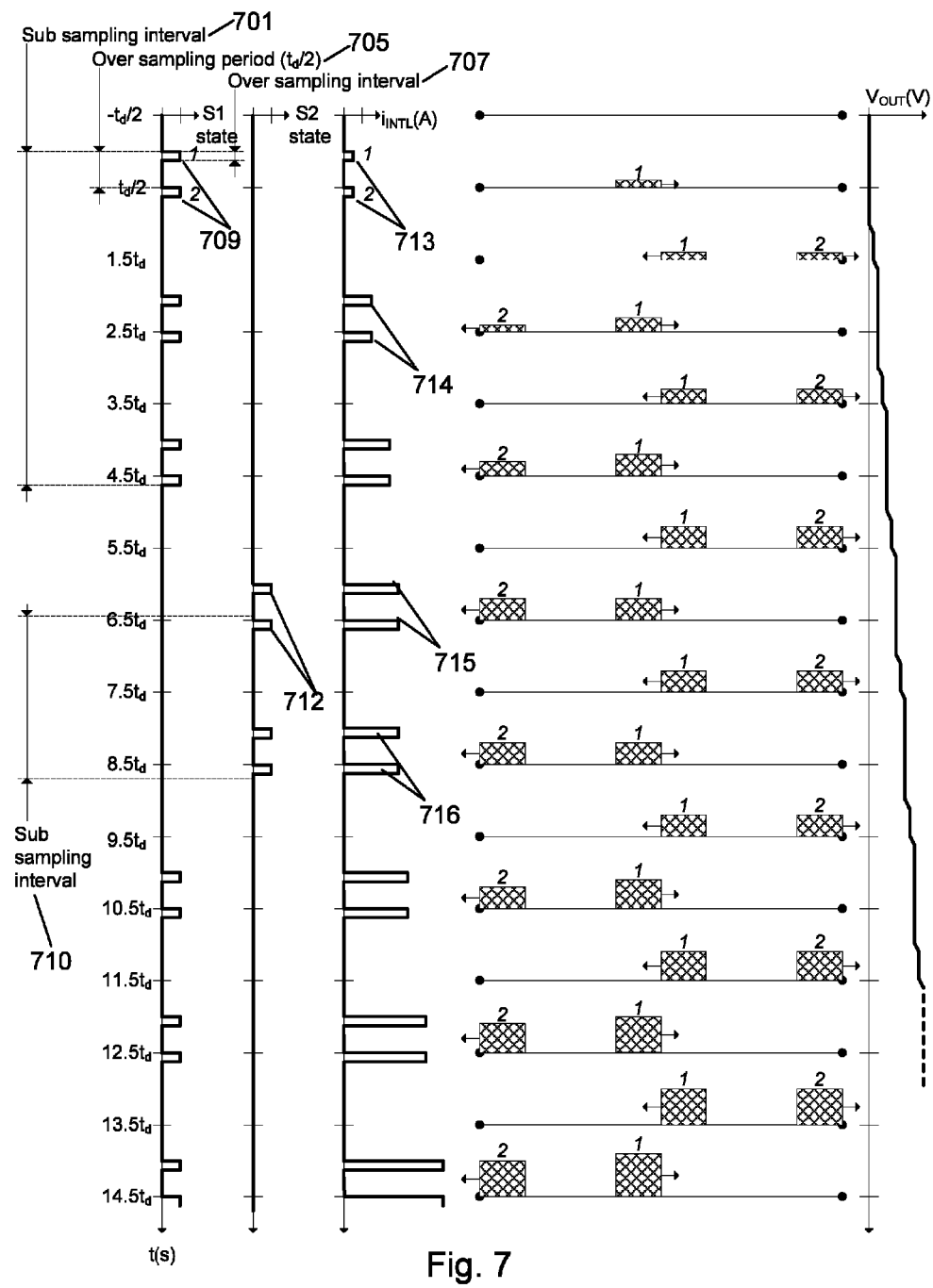
FIG. 7 is a timing and amplitude diagram illustrating operation of a power converter device in mixed sub and over sampling mode according to a fourth embodiment of the present solution.

FIG. 7 illustrates the operation of the power converter device 500 exemplified as a buck converter in mixed sub and over sampling mode, where the over sampling period 705 is $t_d/2$ according to a fourth embodiment of the present solution. The output voltage $V_{OUT}$ of the power converter device 200 is also shown in FIG. 7. See previous description of time instances for the buck-boost circuit in relation to FIG. 4.

Figure 8:
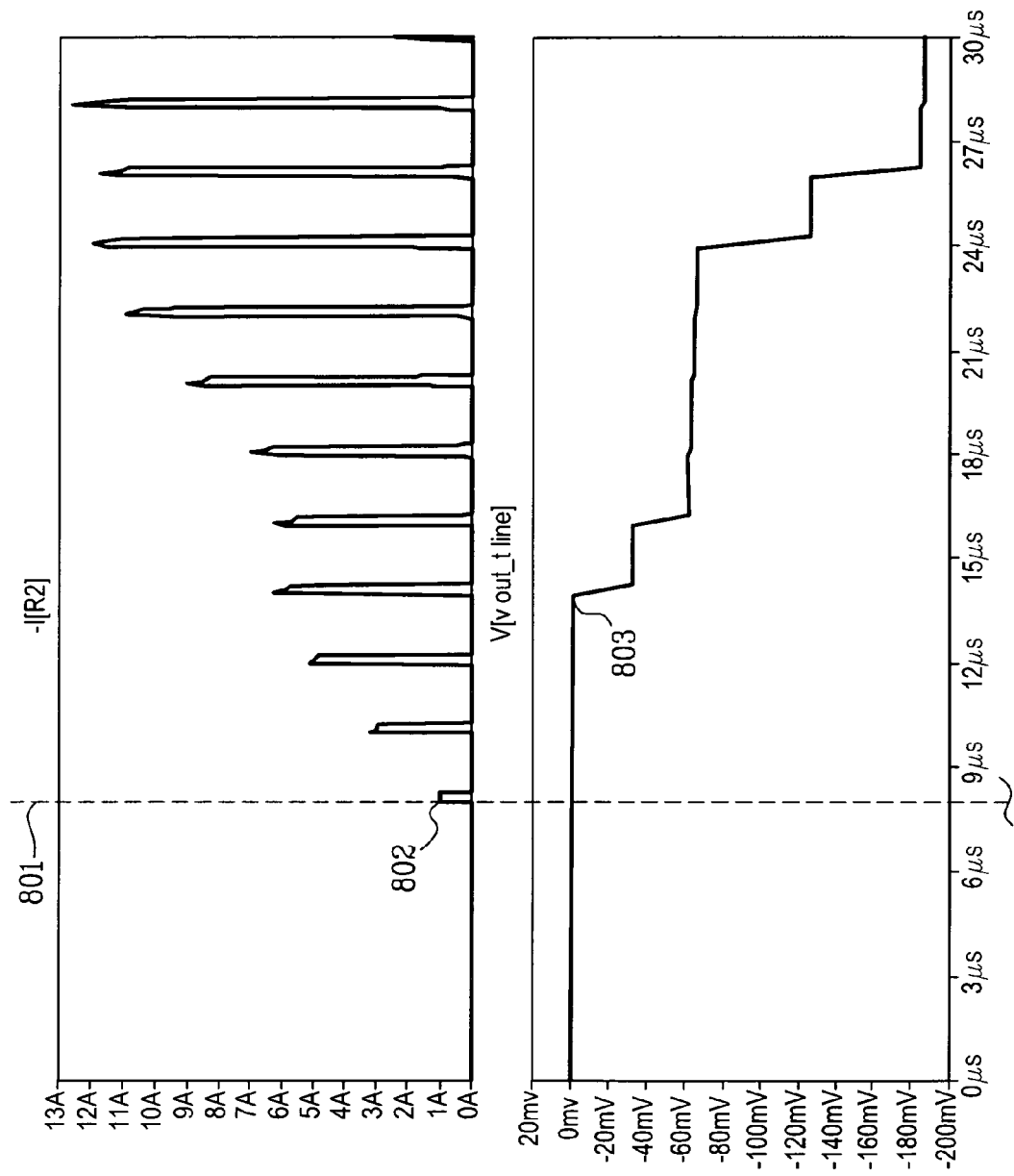
FIG. 8 is a graph depicting the difference between the input current and output voltage waveforms in the buck-boost converter and the buck converter operated in mixed sub- and over sampling mode.
Figure 8:
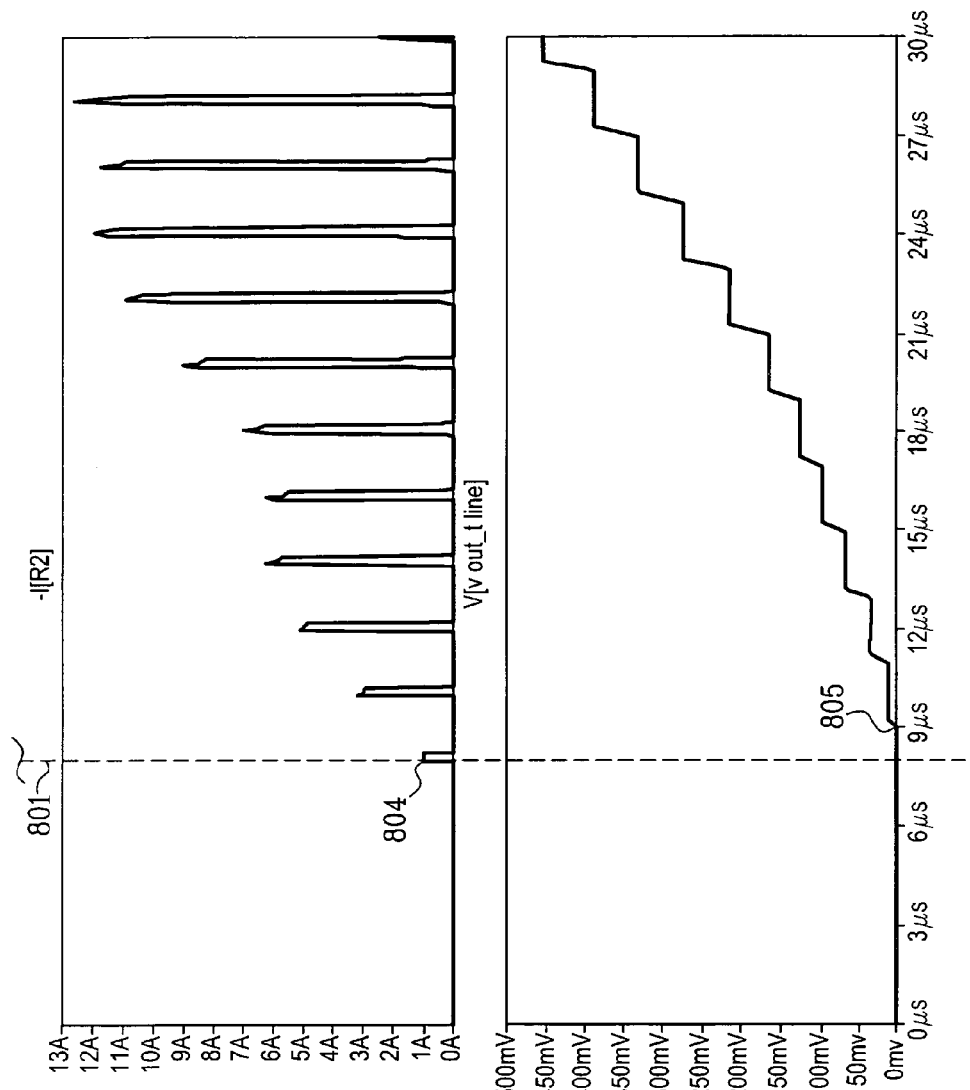

FIG. 8 illustrates the main difference between the waveforms in the buck-boost converter and the buck converter operated in mixed sub- and over sampling mode at an over sampling period time of $2t_d$. During the sub sampling interval 301 the load $R_{LOAD}$ 213 is not directly or indirectly connected to the input power source at the voltage input interface 201 in the buck-boost converter. At start up 801, energy is accumulated in the transmission line TL 105 and the current is increasing according to $i_{INTL}$ in FIGS. 3 and 802 in FIG. 8. No energy is supplied to the load $R_{LOAD}$ 213 during this sub sampling interval. Not until when the energy discharging sub sampling interval 310 is started, the transmission line TL 105 is supplying the capacitor $C_{OUT}$ 209 and $R_{LOAD}$ 213 with energy, and the output voltage will start to raise 211, 803.

During the accumulation sub sampling interval 603 the load $R_{LOAD}$ 513 is connected indirectly through transmission line TL 105 to the input power source 501 in the buck converter circuit. At start up 801, energy is accumulated in the transmission line TL 105 and the current is increasing according to $i_{INTL}$ in FIG. 6 and 804 in FIG. 8. Simultaneously, but with a $t_d$ time delay, the capacitor $C_{OUT}$ 509 and $R_{LOAD}$ 513 are supplied with energy through the transmission line TL 105 that will make the output voltage raise 511, 805 during the energy accumulation sub sampling interval.

The difference described above is in analogy with a comparison of a conventional buck-boost converter and a conventional buck converter that uses an inductor as an energy storing device.

Figure 9:
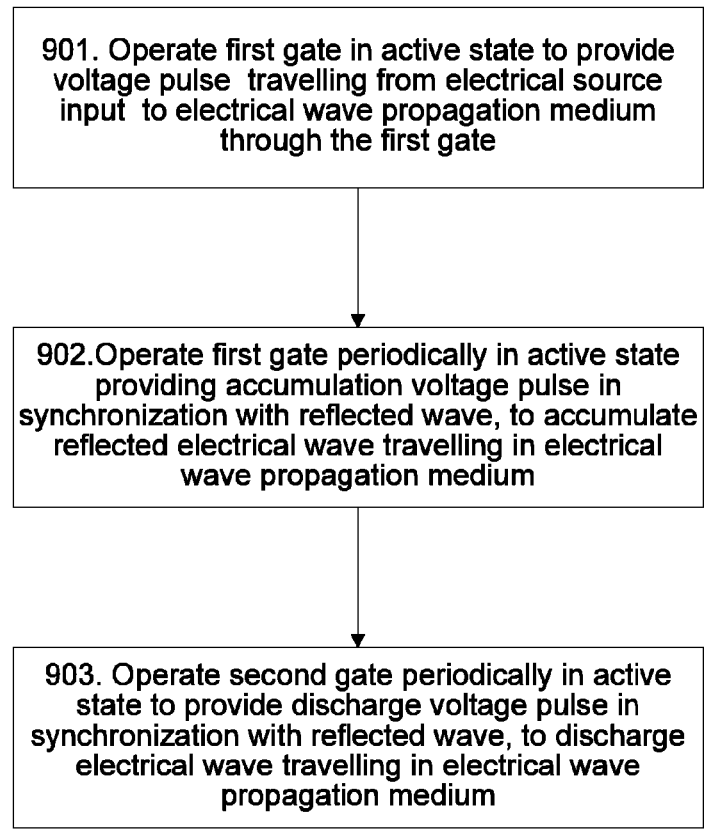
FIG. 9 is a flow diagram illustrating embodiments of a method in a power conversion device.

The method described above will now be described seen from the perspective of the power conversion device 200, 500. FIG. 9 is a flowchart describing the present method for operating the power conversion device 200, 500. The power conversion device 200, 500 comprises at least one electrical input interface 201, 501, at least a first electrical gate 205, 207 and a second electrical gate 207, 507, at least one electrical wave propagation medium 105 and at least one electrical output interface 211, 511 connectable to a load 213, 513. The first electrical gate 205, 505 and second electrical gate 207, 507 may be in a conducting position substantially separated from each other in time. The power conversion device 200, 500 may be one of a DC/DC converter, AC/DC converter or DC/AC converter, power amplifier, radio transmitter with carrier wave generation and mixer or a modulated amplifier. The first electrical gate 205, 505 and the second electrical gate 207, 507 may be operated using a switch controlling unit 215, 515.

Together, the electrical input interface 201, 501, the first gate 205, 505, the second gate 207, 507, the electrical wave propagation medium 105 and the electrical output interface 211, 511 forms an electric circuit. The electric circuit may be configured in different ways, for example as exemplified in FIGS. 5 and 2.

The method comprises the further steps to be performed:

Step 901

The first gate 205, 505 is operated to switch from an inactive state to an active state so as to provide at least one voltage pulse 309, 609 travelling from the electrical input interface 201, 501 to the electrical wave propagation medium 105 through the first gate 205, 505. The at least one voltage pulse has a time duration 307, 607 which is less than two times the wave propagation time through the electrical wave propagation medium 105 to, i.e. $2t_d$. In other words, the time duration 307, 607 is less than the wave propagation time through the electrical wave propagation medium 105 to one end of the electrical wave propagation medium 105 and back to the first gate 205, 505. The at least one voltage pulse is reflected at one end of the electrical wave propagation medium 105 generating at least one reflected electrical wave.

A plurality of voltage pulses 309, 609 may form a pulse train 409, 709.

Step 902

The first gate 205, 505 is operated to periodically switch to an active state providing at least one accumulation voltage pulse in synchronization with the at least one reflected electrical wave, so as to accumulate the reflected electrical wave travelling in the electrical wave propagation medium 105, performing the accumulation through an accumulation sub sampling interval 303, 603.

A plurality of accumulation voltage pulses 309, 609 may form a accumulation voltage pulse train 409, 709.

Step 903

The second gate 207, 507 is operated to periodically switch to an active state such as to provide at least one discharge voltage pulse 312, 612 in synchronization with the at least one reflected wave, so as to discharge the electrical wave travelling in the electrical wave propagation medium 105, performing the discharge through a discharge sub sampling interval 310, 610.

The sub sampling period 301, 601 and the discharge sub sampling interval 310, 610 is in some embodiments, repeated sequentially and iteratively over time.

The accumulation sub sampling interval 303, 603 mentioned in step 902 and the discharge sub sampling interval 310, 610 may be of different length or the same length.

A plurality of discharge voltage pulses 312, 612 may form a discharge voltage pulse train 412, 712.

In some embodiments the operation of the first gate 205, 505 to switch to an active state and the operation of the second gate 207, 507 to switch to an active state is such that a resulting multiple reflected electrical wave is generated in the electrical wave propagation medium 105. As seen in for example FIGS. 3 and 6, the shape and duration of the resulting wave is substantially constant over time and the amplitude of the resulting wave varies over time. However, in the end points of the electrical wave propagation medium 105, the shape and duration of the resulting wave is not the same as the shown waves. I.e. the shape and duration of the resulting wave is only substantially constant when the wave is in the "middle" of the wave propagation medium 105.

In some embodiments, the duration of the active states of the first gate 205,505 and the second gate 207,507, which active states having a duration less than two times the wave propagation time through the electrical wave propagation medium 105, forms an over sampling interval 307,607 that is constant and that is repeated periodically to form an over sampling period 305,605. The accumulated reflected electrical wave and the electrical output interface 211,511 is controlled by adjusting the accumulation sub sampling interval 303,603 in a number of over sampling periods 305,605.

In some embodiments, the duration of the active states of the first gate 205,505 and the second gate 207,507, which active states having a duration less than two times the wave propagation time through the electrical wave propagation medium 105, forms an over sampling interval 307,607 that is constant and that is repeated periodically to form an over sampling period 305,605. The electrical output interface 211, 511 is controlled by adjusting the discharge sub sampling interval 310,610 in a number of over sampling periods 305, 605.

In some embodiments, the duration of the active states of the first gate 205,505 and the second gate 207,507, which active states having a duration less than two times the wave propagation time through the electrical wave propagation medium 105, forms an over sampling interval 307,607, that is constant and that is repeated periodically to form an over sampling period 305,605. The electrical output interface 211, 511 is controlled by adjusting the relation, i.e. duty cycle, between the accumulation sub sampling interval 303,603 and the discharge sub sampling interval 310,610 by adjusting their number of over sampling periods 305,605.

In some embodiments, the duration of the active states of the first gate 205,505 and the second gate 207,507, which active states having a duration less than two times the wave propagation time through the electrical wave propagation medium 105, forms an over sampling interval 307,607, that is repeated periodically to form an over sampling period 305, 605. The electrical output interface 211,511 is controlled by adjusting the over sampling intervals 307,607 during the accumulation sub sampling interval 303,603 and the discharge sub sampling interval 310,610.

In some embodiments, the operating 902 the first gate 205,505 to periodically switch to an active state and the operating 903 the second gate 207,507 to periodically switch to an active state is such that a resulting multiple reflected electrical wave is generated in the electrical wave propagation medium 105. The duration of the resulting wave is substantially constant over time and which amplitude of the resulting wave varies over time.

Figure 10:
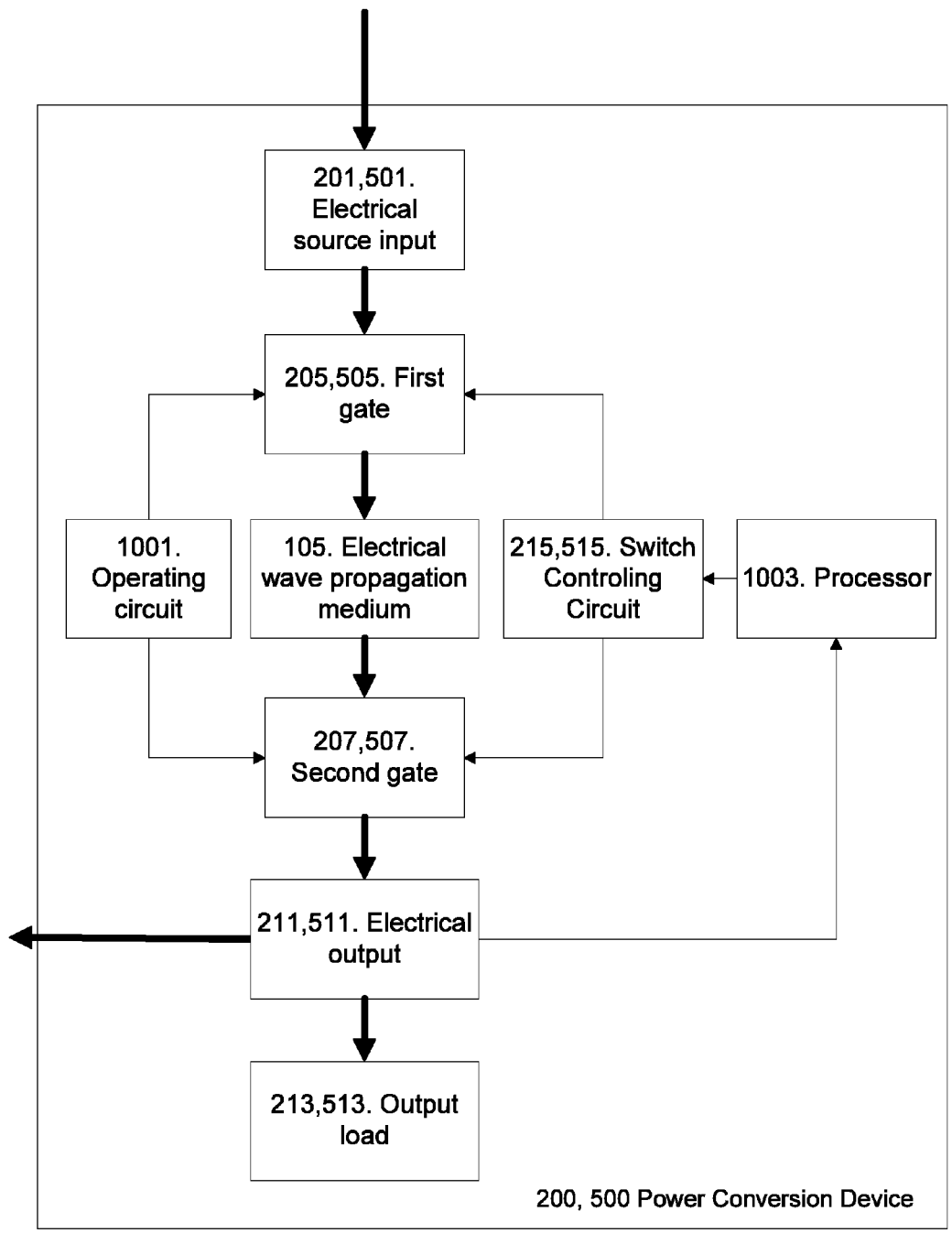
FIG. 10 is a block diagram illustrating embodiments of a power conversion device.

To perform the method steps shown in FIG. 9 for operating a power conversion device the power conversion device comprises a power conversion device arrangement as shown in FIG. 10. The thick arrows in FIG. 10 represent the power flow in the power conversion device. The power conversion device comprises at least one electrical input interface 201, 501, at least a first electrical gate 205, 505 and a second electrical gate 207, 507, at least one electrical wave propagation medium 105 and at least one electrical output interface 211, 511 connectable to a load 213, 513. The first electrical gate 205, 505 and second electrical gate 207, 507 are in a conducting position substantially separated from each other in time. The power conversion device 200, 500 may be one of a DC/DC converter, AC/DC converter, DC/AC converter, power amplifier, radio transmitter with carrier wave generation and mixer or a modulated amplifier.

The power conversion device 200, 500 further comprises an operating circuit 1001 configured to operate the first gate 205, 505 to switch to an active state so as to provide at least one voltage pulse 309, 609 travelling from the electrical input interface 201, 501 to the electrical wave propagation medium 105 through the first gate 205, 505. The at least one voltage pulse has a time duration 307,407 which is less than two times the wave propagation time through the electrical wave propagation medium 105, i.e. $2t_d$. The at least one voltage pulse being reflected at one end of the electrical wave propagation medium 105. The operating circuit 1001 is further configured to operate the first gate 205, 505 to periodically switch to an active state providing at least one accumulation voltage pulse in synchronization with the at least one reflected electrical wave, so as to accumulate the reflected electrical wave travelling in the electrical wave propagation medium 105, performing the accumulation through an accumulation sub sampling interval 303, 603. The operating circuit 1001 is also configured to operate the second gate 207, 507 to periodically switch to an active state such as to provide at least one discharge voltage pulse 312, 612 in synchronization with the at least one reflected electrical wave, so as to discharge the electrical wave travelling in the electrical wave propagation medium 105, performing the discharge through a discharge sub sampling interval 310, 610.

The accumulation sub sampling period 303,603 and the discharge sub sampling interval 310,610 is, in some embodiments, repeated sequentially and iteratively over time.

The operating circuit 1001 is further configured to form a pulse train 409, 709 from a plurality of voltage pulses 309, 609.

The operating circuit 1001 is further configured to form a discharge voltage pulse train from a plurality of discharge voltage pulses 412, 712.

The power conversion device 200, 500 comprises a switch controlling unit 215, 515 configured to operate the first electrical gate 205, 505 and the second electrical gate 207, 507.

Together, the electrical input interface 201, 501, the first gate 205, 505, the second gate 207, 509, the electrical wave propagation medium 105, the electrical output interface 211, 511, the operating circuit 1001 and the switch controlling unit 215, forms an electric circuit. These components may be arranged in different ways, for example as exemplified in FIGS. 5 and 2.

In some embodiments, the duration of the active states of the first gate 205,505 and the second gate 207,507, which active states having a duration less than two times the wave propagation time through the electrical wave propagation medium 105, forms an over sampling interval 307,607 that is constant and that is repeated periodically to form an over sampling period 305,605. The accumulated reflected electrical wave and the electrical output interface 211,511 is controlled by adjusting the accumulation sub sampling interval 303,603 in a number of over sampling periods 305,605.

In some embodiments, the duration of the active states of the first gate 205,505 and the second gate 207,507, which active states having a duration less than two times the wave propagation time through the electrical wave propagation medium 105, forms an over sampling interval 307,607 that is constant and that is repeated periodically to form an over sampling period 305,605. The electrical output interface 211, 511 is controlled by adjusting the discharge sub sampling interval 310,610 in a number of over sampling periods 305, 605.

In some embodiments, the duration of the active states of the first gate 205,505 and the second gate 207,507, which active states having a duration less than two times the wave propagation time through the electrical wave propagation medium 105, forms an over sampling interval 307,607, that is constant and that is repeated periodically to form an over sampling period 305,605. The electrical output interface 211, 511 is controlled by adjusting the relation, i.e. duty cycle, between the accumulation sub sampling interval 303,603 and the discharge sub sampling interval 310,610 by adjusting their number of over sampling periods 305,605.

In some embodiments, the duration of the active states of the first gate 205,505 and the second gate 207,507, which active states having a duration less than two times the wave propagation time through the electrical wave propagation medium 105, forms an over sampling interval 307,607, that is repeated periodically to form an over sampling period 305, 605. The electrical output interface 211,511 is controlled by adjusting the over sampling intervals 307,607 during the accumulation sub sampling interval 303,603 and the discharge sub sampling interval 310,610.

In some embodiments, the operating 902 the first gate 205,505 to periodically switch to an active state and the operating 903 the second gate 207,507 to periodically switch to an active state is such that a resulting multiple reflected electrical wave is generated in the electrical wave propagation medium 105, which duration of the resulting wave is substantially constant over time and which amplitude of the resulting wave varies over time.

Beside the buck and buck-boost circuits described in FIG. 2-7 may the described mixed sub and over sampling operation mode be used in boost, Ćuk, Single-Ended Primary Inductance Converter (SEPIC) or other types of non isolated or transformer isolated power converter circuits (not shown in any figure).

The present mechanism for operating a power conversion device may be implemented through one or more processors, such as a processor 1003 in the power conversion device depicted in FIG. 10, together with computer program code for performing the functions of the present solution. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the present solution when being loaded into the controlling device. One such carrier may be in the form of a Compact Disk Read Only Memory (CD ROM) disc. It is however feasible with other data carriers such as a memory stick. The computer program code may furthermore be provided as pure program code on a server and downloaded to the controlling device remotely.

The present solution is not limited to the above described preferred embodiments. Various alternatives, modifications and equivalents may be used. Therefore, the above embodiments should not be taken as limiting the scope of the solution, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof.

It should also be emphasized that the steps of the methods defined in the appended claims may, without departing from the present solution, be performed in another order than the order in which they appear in the claims.

| ABBREVIATIONS AND DEFINITIONS | |
|---|---|
| AC | Alternating Current |
| ASIC | Application Specific Integrated Circuit |
| CD ROM | Compact Disk Read Only Memory |
| DC | Direct Current |
| DSP | Digital Signal Processor |
| FPGA | Field-programmable gate array |
| LDO | Low Drop Out |
| OVS | OVer Sampling |
| PCB | Printed Circuit Board |
| SEPIC | Single-Ended Primary Inductance Converter |
| SUS | SUb Sampling |
| TL | Transmission Line |

The invention claimed is:

1. A method for operating a power conversion device, the power conversion device comprising at least one electrical input interface, at least a first electrical gate and a second electrical gate, at least one electrical wave propagation medium, and at least one electrical output interface connectable to a load; the electrical input interface, the first gate, the second gate, the electrical wave propagation medium, and the electrical output interface together forming an electric circuit, the method comprising:
operating the first gate to switch to an active state so as to provide at least one voltage pulse travelling from the electrical input interface to the electrical wave propagation medium through the first gate; the at least one voltage pulse having a time duration less than two times a wave propagation time through the electrical wave propagation medium; the at least one voltage pulse being reflected at one end of the electrical wave propagation medium;
operating the first gate to periodically switch to an active state providing at least one accumulation voltage pulse in synchronization with the at least one reflected electrical wave, so as to accumulate the reflected electrical wave travelling in the electrical wave propagation medium through an accumulation sub sampling interval;
operating the second gate to periodically switch to an active state so as to provide at least one discharge voltage pulse in synchronization with the at least one reflected electrical wave, so as to discharge the electrical wave travelling in the electrical wave propagation medium through a discharge sub sampling interval.

2. The method of claim 1, wherein the at least one voltage pulse comprises a plurality of voltage pulses forming a pulse train.

3. The method of claim 1, wherein a plurality of discharge voltage pulses forms a discharge voltage pulse train.

4. The method of claim 1, wherein the first electrical gate and second electrical gate are in a conducting position substantially separated from each other in time.

5. The method of claim 1:
wherein the active states of the first and second gates have a duration less than two times the wave propagation time through the electrical wave propagation medium;
wherein the duration of the active states of the first gate and the second gate form an over sampling interval that is constant and that is repeated periodically to form an over sampling period;
further comprising controlling an accumulated reflected electrical wave and the electrical output interface by adjusting the accumulation sub sampling interval in a number of over sampling periods.

6. The method of claim 1:
wherein the active states of the first and second gates have a duration less than two times the wave propagation time through the electrical wave propagation medium;
wherein the duration of the active states of the first gate and the second gate form an over sampling interval that is constant and that is repeated periodically to form an over sampling period;
further comprising controlling the electrical output interface by adjusting the discharge sub sampling interval in a number of over sampling periods.

7. The method of claim 1:
wherein the active states of the first and second gates have a duration less than two times the wave propagation time through the electrical wave propagation medium;
wherein the duration of the active states of the first gate and the second gate form an over sampling interval that is constant and that is repeated periodically to form an over sampling period;
further comprising controlling the electrical output interface by adjusting a relation between the accumulation sub sampling interval and the discharge sub sampling interval by adjusting their number of over sampling periods.

8. The method of claim 1:
wherein the active states of the first and second gates have a duration less than two times the wave propagation time through the electrical wave propagation medium;
wherein the duration of the active states of the first gate and the second gate form an over sampling interval that is constant and that is repeated periodically to form an over sampling period;
further comprising controlling the electrical output interface by adjusting the over sampling intervals during the accumulation sub sampling interval and the discharge sub sampling interval.

9. The method of claim 1:
wherein the operating the first gate to periodically switch to an active state and the operating the second gate to periodically switch to an active state is such that a resulting multiple reflected electrical wave is generated in the electrical wave propagation medium;
wherein a duration of the resulting multiple reflected electrical wave is substantially constant over time and an amplitude thereof varies over time.

10. The method of claim 1, wherein the accumulation sub sampling interval and the discharge sub sampling interval are repeated sequentially and iteratively over time.

11. The method of claim 1, wherein the power conversion device is one of:
a DC/DC converter;
a AC/DC converter;
a DC/AC converter;
a power amplifier;
a radio transmitter with carrier wave generation and mixer;
a modulated amplifier.

12. The method of claim 1, wherein the operating the first electrical gate and the operating the second gate comprise using a switch controlling circuit.

13. A power conversion device comprising:
at least one electrical input interface;
at least a first electrical gate and a second electrical gate;
at least one electrical wave propagation medium;
at least one electrical output interface connectable to a load;
an operating circuit configured to:
  operate the first gate to switch to an active state so as to provide at least one voltage pulse travelling from the electrical input interface to the electrical wave propagation medium through the first gate; the at least one voltage pulse having a time duration less than two times the wave propagation time through the electrical wave propagation medium; the at least one voltage pulse being reflected at one end of the electrical wave propagation medium;
  operate the first gate to periodically switch to an active state providing at least one accumulation voltage pulse in synchronization with the at least one reflected wave so as to accumulate a reflected electrical wave travelling in the electrical wave propagation medium through an accumulation sub sampling interval;
  operate the second gate to periodically switch to an active state so as to provide at least one discharge voltage pulse in synchronization with the at least one reflected electrical wave so as to discharge the electrical wave travelling in the electrical wave propagation medium through a discharge sub sampling interval;
wherein the electrical input interface, the first gate, the second gate, the electrical wave propagation medium, the electrical output interface, and the operating circuit together forming an electric circuit.

14. The power conversion device of claim 13:
wherein the active states of the first and second gates have a duration less than two times the wave propagation time through the electrical wave propagation medium;
wherein the duration of the active states of the first gate and the second gate form an over sampling interval that is constant and that is repeated periodically to form an over sampling period;
wherein the accumulated reflected electrical wave and the electrical output interface are controlled by adjusting the accumulation sub sampling interval in a number of over sampling periods.

15. The power conversion device of claim 13, further comprising a switch controlling circuit configured to operate the first electrical gate and the second electrical gate.

* * * * *

UNITED STATES PATENT AND TRADEMARK OFFICE
CERTIFICATE OF CORRECTION

| | |
|---|---|
| PATENT NO. | : 8,766,607 B2 |
| APPLICATION NO. | : 13/702268 |
| DATED | : July 1, 2014 |
| INVENTOR(S) | : Sander |

Page 1 of 1

It is certified that error appears in the above-identified patent and that said Letters Patent is hereby corrected as shown below:

In the Specification

In Column 9, Lines 31-32, delete "interval 301" and insert -- interval 303 --, therefor.

In Column 9, Line 61, delete "205, 207" and insert -- 205, 505 --, therefor.

In Column 12, Line 39, delete "207, 509" and insert -- 207, 507, --, therefor.

Signed and Sealed this
Tenth Day of March, 2015

Michelle K. Lee
*Deputy Director of the United States Patent and Trademark Office*